United States Patent
Elabd et al.

(10) Patent No.: US 11,469,423 B2
(45) Date of Patent: Oct. 11, 2022

(54) ION CONDUCTING NANOFIBER FUEL CELL ELECTRODES

(71) Applicant: Drexel University, Philadelphia, PA (US)

(72) Inventors: Yossef A. Elabd, Wallingford, PA (US); Francis W. Richey, Coatesville, PA (US); Kevin H. Wujcik, Mount Laurel, NJ (US)

(73) Assignee: Drexel University, Philadelphia, PA (US)

( * ) Notice: Subject to any disclaimer, the term of this patent is extended or adjusted under 35 U.S.C. 154(b) by 179 days.

(21) Appl. No.: 16/878,298

(22) Filed: May 19, 2020

(65) Prior Publication Data

US 2020/0350593 A1  Nov. 5, 2020

Related U.S. Application Data

(63) Continuation of application No. 13/966,556, filed on Aug. 14, 2013, now abandoned.

(60) Provisional application No. 61/682,820, filed on Aug. 14, 2012.

(51) Int. Cl.
| | |
|---|---|
| *H01M 8/02* | (2016.01) |
| *H01M 4/86* | (2006.01) |
| *H01M 4/92* | (2006.01) |
| *H01M 4/88* | (2006.01) |
| *D01D 5/00* | (2006.01) |
| *H01M 8/10* | (2016.01) |

(52) U.S. Cl.
CPC ........ *H01M 4/8657* (2013.01); *D01D 5/0061* (2013.01); *H01M 4/8853* (2013.01); *H01M 4/926* (2013.01); *H01M 8/02* (2013.01); *H01M 2008/1095* (2013.01)

(58) Field of Classification Search
None
See application file for complete search history.

(56) References Cited

U.S. PATENT DOCUMENTS

| | | |
|---|---|---|
| 7,229,944 B2 | 6/2007 | Shao-Horn et al. |
| 7,887,772 B2 | 2/2011 | Jo et al. |
| 2006/0019819 A1 | 1/2006 | Shao-Horn et al. |
| 2008/0248362 A1 | 10/2008 | Sayre et al. |
| 2010/0227247 A1 | 9/2010 | Pintauro et al. |
| 2010/0285392 A1 | 11/2010 | Elabd et al. |
| 2011/0171565 A1 | 7/2011 | Birkan et al. |

(Continued)

FOREIGN PATENT DOCUMENTS

WO    WO-2012/058425 A2    5/2012

OTHER PUBLICATIONS

Zhang et al., Adv. Mater., 2007, 19, 3664. (Year: 2007).*

(Continued)

*Primary Examiner* — Zhongqing Wei
(74) *Attorney, Agent, or Firm* — Winstead PC

(57) ABSTRACT

The present invention is directed to methods of making a nanofiber-nanoparticle network to be used as electrodes of fuel cells. The method comprises electrospinning a polymer-containing material on a substrate to form nanofibers and electrospraying a catalyst-containing material on the nanofibers on the same substrate. The nanofiber-nanoparticle network made by the methods is suitable for use as electrodes in fuel cells.

20 Claims, 14 Drawing Sheets

(56) References Cited

U.S. PATENT DOCUMENTS

2012/0028170 A1      2/2012   Sarlak et al.
2013/0209913 A1*   8/2013   Pintauro .............. D01D 5/0007
                                                                                                                              429/482

OTHER PUBLICATIONS

Yang, Minchul et al.; "Direct Writing of a Conducting Polymer with Molecular-Level Control of Physical Dimensions and Orientation"; Journal of the American Chemical Society Communications; vol. 128; 2006; pp. 6774-6775.

Katta et al.; Nano Letters; 4(11); 2006; pp. 2215-2218.

Frenot, A. et al.; "Polymer Nanofibers Assembled by Electrospinning"; Current Opinion in Colloid & Interface Science; vol. 8, issue 1; Mar. 2003; pp. 64-75.

Salata, O.V.; "Tools of Nanatechnology: Electrospray"; Current Nanoscience; vol. 1; 2005; pp. 25-33.

Zhang, D. et al.; "Electrospinning of Three-Dimensional Nanofibrous Tubes with Controllable Architectures"; Nano Letters; vol. 8 No. 10; 2008; pp. 3283-3287.

Reijers, R. and Haije, W.; Literature Review on High Temperature Proton Conducting Materials. Energy Research Centre of the Netherlands: ECN-E-08-091; Dec. 2008; pp. 1-58.

* cited by examiner

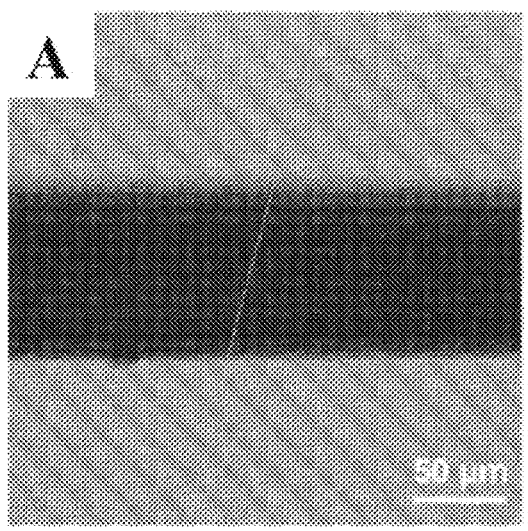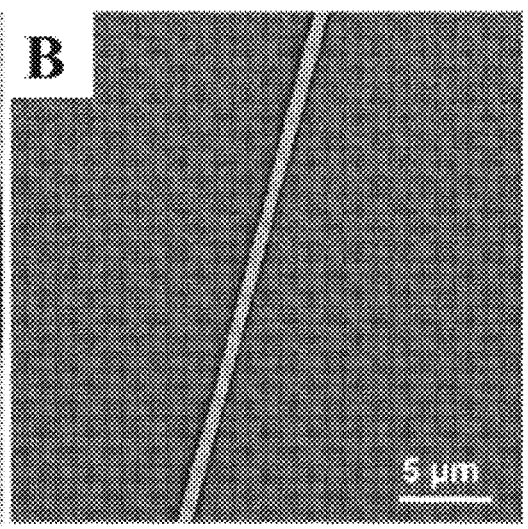
FIG. 3A  FIG. 3B
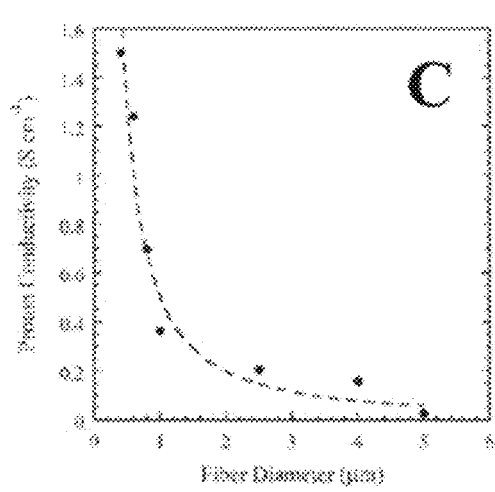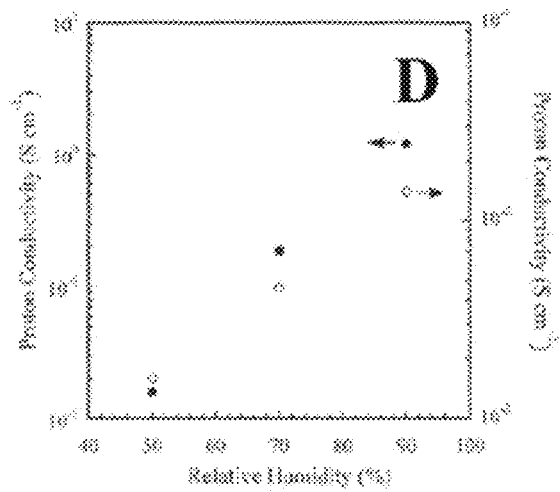
FIG. 3C  FIG. 3D

ION CONDUCTING NANOFIBER FUEL CELL ELECTRODES

CROSS-REFERENCES TO RELATED APPLICATIONS

This patent application is a continuation of U.S. application Ser. No. 13/966,556, filed Aug. 14, 2013. U.S. application Ser. No. 13/966,556 claims priority to U.S. Provisional Patent Application No. 61/682,820, filed Aug. 14, 2012, which is incorporated herein by reference.

BACKGROUND OF THE INVENTION

1. Field of the Invention

The present invention relates to electrodes for fuel cells. In particular, it is directed to a process for manufacturing a nanofiber-nanoparticle network that is useful for the manufacture of electrodes for use in fuel cells, to electrodes made by this process and to fuel cells incorporating such electrodes.

2. Description of the Related Technology

Fuel cells provide several advantages over batteries, such as high efficiency, high energy and power density, low weight, low-temperature operation, rapid start-up time, and quick fuels from renewable sources with no point-of-use greenhouse gas emissions. However, one major factor that has limited the mass commercialization of fuel cells, especially fuel cell vehicles, is the high cost due to the catalysts requires for use in fuel cells. The catalyst is usually a precious metal catalyst which currently contributes to over 30% of the fuel cell engine cost.

Technologies that can reduce the amount of precious metal catalyst needed (i.e. allow low catalyst loadings) while still providing good performance (e.g. high power density) are critical to the successful commercialization of fuel cells. Because the catalyst functions on its surface where it is in contact with a fuel, such as hydrogen or methane, the larger the surface area of the catalyst per unit weight, the lower the required catalyst loading. Extensive efforts have been invested towards increasing the surface area of fuel cell catalysts.

U.S. Pat. No. 7,229,944 discloses a process of making fiber structures based on interconnected carbon fibers for use with catalytic material. The catalytic material may be in the form of nanosize particles supported on the fibers. The structures are produced by electrospinning a polymeric material fiber structure that is subsequently converted to a carbon fiber structure in a heat treatment step which also causes the catalyst particles to nucleate on the carbon fibers and grow to a desired nanosize. The catalyst may be uniformly distributed across the carbon fiber structure before nucleation and the amount of catalyst may be controlled. These factors may enhance catalytic performance and/or enable use of less catalyst for equivalent catalytic performance which can lead to cost savings, amongst other advantages.

U.S. Pat. No. 7,887,772 discloses an ultrafine graphitic carbon fiber having a diameter of 1 to 3000 nm that is prepared by electrospinning a halogenated polymer solution containing a metal compound for inducing graphitization. An ultrafine porous graphitic carbon fiber having a large specific surface area, micropores and macropores is prepared by graphitization using a metal catalyst generated from the metal compound. The ultrafine carbon fiber can be used for storing hydrogen, an adsorbing material for biochemically noxious substances, an electrode material for a supercapacitor, a secondary cell material, a fuel cell material, or a catalyst carrier material.

U.S. Patent Application Publication No. US 2012/0028170 discloses a fuel cell electrode made by synthesizing carbon nanotubes grafted with poly(citric acid) and encapsulating a platinum group metal nanoparticle. More specifically, carbon nanotubes are oxidized, followed by mixing with monohydrated citric acid, which results in carbon nanotubes grafted with poly(citric acid). The carbon nanotubes grafted with poly(citric acid) are then mixed with one or more sources of platinum group metal ions to encapsulate the platinum group metal nanoparticles. Finally, the carbon nanotubes encapsulated with platinum group metal nanoparticles are electrosprayed onto an electrode of a fuel cell. The present invention is aimed at achieving high power densities in fuel cells with relatively low catalyst loadings.

SUMMARY OF THE INVENTION

In a first aspect, the present invention is directed to a method for making a nanofiber-nanoparticle network useful in an electrode for a fuel cell. The method includes the steps of electrospraying a catalyst-containing material and electrospinning a polymer-containing material to form a nanofiber-nanoparticle network.

Another aspect of the present invention is an electrode for fuel cells comprising the nanofiber-nanoparticle network manufactured by the method of the present invention.

Yet another aspect of the present invention is a fuel cell that uses an electrode comprising the nanofiber-nanoparticle network manufactured by the method of the present invention.

Yet other aspects of the present invention relate to a method for making a patterned nanofiber-nanoparticle network useful in an electrode for a fuel cell, electrodes made with the patterned nanofiber-nanoparticle network and fuel cells including such electrodes.

In a still further aspect of the present, catalyst materials for use in fuel cells are provided, as well as electrodes and fuel cells including these catalyst materials. These catalysts may include platinum/carbide derived carbon (Pt/CDC).

BRIEF DESCRIPTION OF THE DRAWINGS

FIG. 3A shows a single Nafion™ nanofiber bridging two electrodes.

FIG. 3B shows an enlarged image of FIG. 3A.

FIG. 3C is a plot of the proton conductivity of a Nafion™ nanofiber vs. the nanofiber diameter.

FIG. 3D is a plot of the proton conductivity of a Nafion™ nanofiber vs. relative humidity.

DETAILED DESCRIPTION OF THE PREFERRED EMBODIMENT(S)

Figure 1:
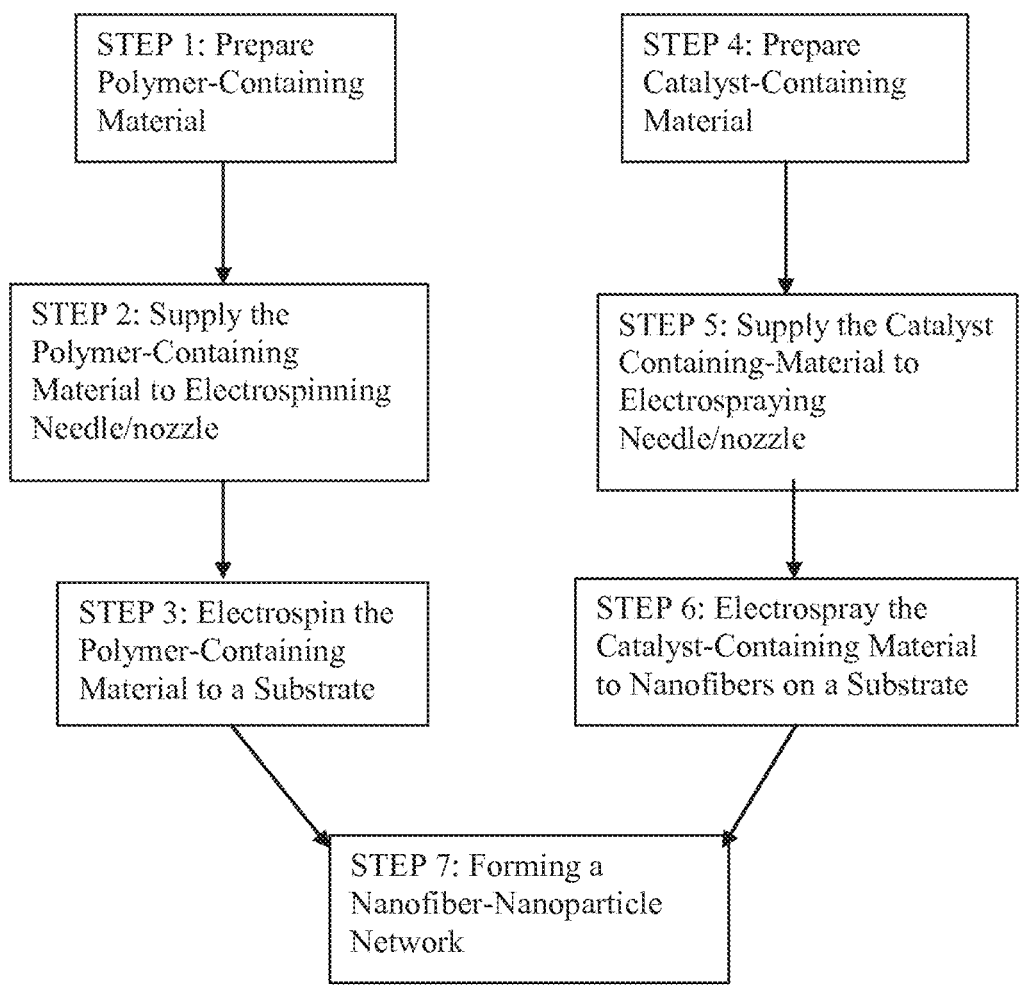
FIG. 1 shows a flow chart of a process for manufacturing a nanofiber-nanoparticle network according to the present invention.

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

In a first aspect, the present invention relates to a novel process for manufacturing a nanofiber-nanoparticle network useful for fuel cell electrodes. The process comprises two steps: electrospinning of a polymer-containing material; and electrospraying of a catalyst-containing material onto the electrospun polymer. The electrospinning and electrospraying may be carried out in any suitable manner. Some examples include electrospinning and electrospraying simultaneously, or first electrospinning and then electrospraying.

Electrodes made in this manner have more catalyst surface area available for an oxygen reduction reaction because a large percentage of catalyst in such electrodes can directly contact the fuel in the fuel cell. Such electrodes therefore require less catalyst than electrodes using conventional supported catalysts, thereby permitting low or ultralow catalyst loadings. In addition, these catalysts are more efficient for oxidization of the fuel, i.e. provide a higher power density than conventional fuel cell electrodes Referring to FIG. 1, step 1 of the process may involve preparation of a polymer-containing material. The polymer-containing material contains at least one polymer, preferably Nafion™ However, any suitable polymer may be used to make the nanofiber material. In general, the polymer needs to have properties that make it possible to fabricate a nanofiber support using electrospinning. In addition, the polymer may have a proton conductivity of from about 0.001 mS/cm to about 10 S/cm, or from about 0.1 mS/cm to about 1 S/cm, or from about 0.1 S/cm to about 1 S/cm. Suitable polymer materials include, but are not limited to, Nafion™, sulfonated poly(ether ether ketone), sulfonated polyer(styrene-b-ethylene-r-butadiene-b-styrene), sulfonated poly(styrene), sulfonated poly(arylene ether) copolymer, sulfonated poly(styrene-b-isobutylene-b-styrene).

In one embodiment, the polymer may be dissolved in a suitable solvent to provide a polymer solution for electrospinning Suitable solvents are known to those of skill in the art and their suitability depends, at least in part, on the characteristics of the polymer. Suitable solvents may include, for example, N,N-dimethylformamide (DMF), ethanol, methanol, acetone, water, tetrahydrofuran (THF), methylene chloride (MC or dichloromethane) and combinations thereof. It should be understood that a skilled person in the art may also choose other solvents that are suitable for a particular process.

The concentration of the polymer in the polymer solution used for electrospinning can be determined by a skilled person based on, for example, the desired viscosity of the polymer solution. Typical polymer concentrations may be between about 8% and about 20% by weight of the solution, and more preferably between about 8% and about 15% by weight of the solution. Such concentrations generally result in the solution having a suitable viscosity for electrospinning. It should be understood that concentrations outside the above ranges may also be used if the resultant polymer solution is suitable for electrospinning.

In another embodiment, the polymer may be melted, preferably by heating, to make a liquid polymer having a suitable viscosity for electrospinning. Depending on the characteristics of the polymer used, it may be preferred to melt the polymer, instead of using a solvent to provide a polymer solution. When a melted polymer is used as the electrospinning material, the melted polymer may need to be maintained at elevated temperature for electrospinning.

Thus, some modification of the electrospinning apparatus may be needed to accommodate this heating requirement, such as providing a heated electrospinning needle/nozzle.

In step 2 of FIG. 1, the polymer-containing materials supplied to at least one electro spinning needle/nozzle (hereinafter needle/nozzle is referred to as "needle"). In a preferred embodiment, the polymer-containing material is pumped to the electrospinning needle. Any other suitable means for supplying the polymer-containing material to the electrospinning needle may be used in the present invention.

In step 3 of FIG. 1, the electrospinning needle electrospins the polymer-containing material onto a grounded substrate as a fine stream with its diameter in the nanometer range. In a typical apparatus for electrospinning, the electrospinning needle is connected to a high voltage power supply, while the conductive substrate is grounded. Thus an electromagnetic field is formed between the electrospinning needle and the grounded substrate. The polymer-containing material, aided by the force of the electromagnetic field, travels to the substrate by electrostatic attraction.

The voltage applied to the electrospinning needle may depend on the polymer and the viscosity of the polymer-containing material prepared from the polymer. In an exemplary embodiment, the voltage applied to the electrospinning needle is between about 3 kV and about 50 kV, or between about 10 kV and about 40 kV.

The distance between the tip of the electrospinning needle and the substrate may depend on the diameter of the polymer-containing material stream, as well as the viscosity of the polymer-containing material. In general, a finer stream and lower viscosity may require a shorter distance between the electrospinning needle and the substrate. In some exemplary embodiments, the distance between the tip of the electrospinning needle and the substrate may be between about 1 cm and about 50 cm, more preferably between about 5 cm and 35 cm.

The speed of electrospinning may depend on the polymer. Generally speaking, the faster the polymer-containing material solidifies or dries, the higher the speed of electrospinning that may be used. The polymer material may be dispensed for example at about 0.1 to about 10 mL/hour) through the electrospinning needle.

In an exemplary embodiment, one electrospinning needle is used to spin the polymer-containing material onto the substrate. However, in some embodiments, it may be desirable to use multiple electrospinning needles. A general description of an electrospinning process is provided, for example, in "Polymer Nanofibers Assembled by Electrospinning", Frenot et. al, Current Opinion in Colloid and Interface Science, vol. 8, pages 64-75, 2003, which is incorporated herein by reference in its entirety.

In some embodiments, the polymer-containing material may form a continuous nanofiber, or the nanofiber may break and a plurality of separate nanofibers may form on the substrate.

In step 4 of FIG. 1, a catalyst-containing material suitable for electrospraying is prepared. In some embodiments, the catalyst-containing material is a solution that contains at least one catalyst that can function as an oxidation/reduction catalyst in a fuel cell. The catalyst may be selected from, but is not limited to, palladium, platinum, gold, silver, nickel, rhodium, ruthenium, rhenium, osmium, iridium, iron, chromium, cobalt, copper, manganese, tungsten, niobium, titanium, tantalum, lead, indium, cadmium, tin, bismuth, gallium, as well as mixtures, compounds and alloys of these metals. In some embodiments, palladium and platinum may be the preferred catalysts.

Figure 5A:
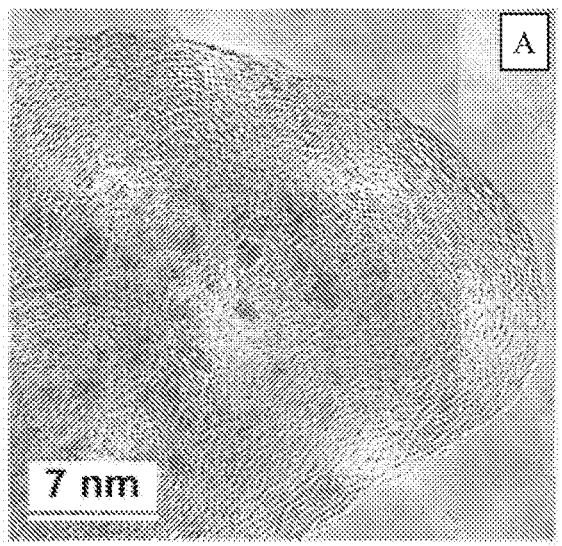
FIG. 5A is an SEM image of a commercial Pt/C catalyst.
Figure 5B:
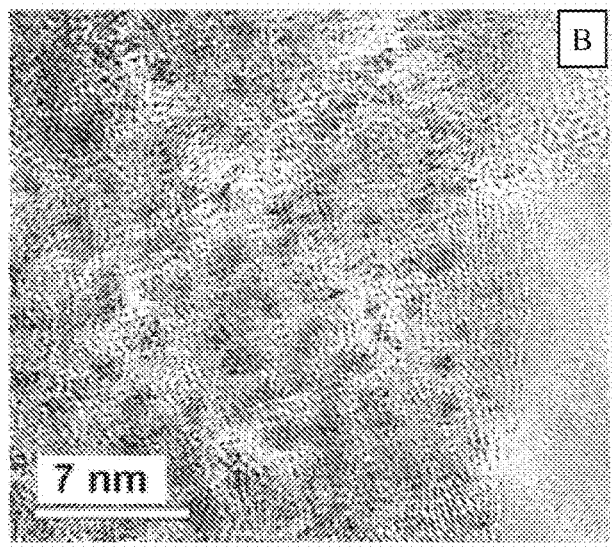
FIG. 5B is an SEM image of a platinum/carbide derived carbon (Pt/CDC) supported catalyst according to the present invention.

The present invention may also employ new catalysts for fuel cells. These catalysts include platinum/carbide derived carbon (Pt/CDC). The platinum on CDC supports (FIG. 5B) has a higher nanoporosity than a comparable platinum on amorphous carbon catalyst (FIG. 5A). Therefore, higher platinum surface area to volume ratios can be achieved with the Pt/CDC catalyst. Examples of such catalysts can be found, for example, in US 2010/0285392 A1.

In step 5 of FIG. 1, the catalyst-containing material is supplied to the electrospraying nozzle or needle (hereinafter collectively referred to as a "needle"). In one embodiment, the catalyst-containing material is pumped to the electrospraying needle. Any other means known to persons skilled in the art that are capable of supplying the catalyst-containing material to the needle may be used in the present invention.

In step 6 of FIG. 1, the electrospraying needle sprays the catalyst-containing material as fine droplets onto the electrospun material or the formed nanofibers. The sprayed fine droplets containing catalyst material are electrostatically attracted to the substrate as discussed below by electrostatic attraction. For the present invention, the same high voltage power supply may be connected to both the electrospray needle and the electrospinning needle, or they may be connected to different high voltage power supplies. In one exemplary embodiment, the voltage applied to the electrospraying needle is between about 3 kV and about 45 kV.

The distance between the tip of the electrospray needle and the substrate may depend on the size of the sprayed droplets, as well as the viscosity of the sprayed catalyst-containing material. In general, the smaller the size of the sprayed material droplets and lower viscosity will require shorter distance between the electrospray needle and the substrate. In some exemplary embodiments, the distance may be between about 1 cm and about 50 cm, more preferably between about 3 cm and 30 cm.

The speed of electrospraying of the catalyst-containing material may depend on the speed at which the nanofibers are formed on the substrate and the desired nanoparticle density on the nanofibers. For example, the catalyst material may be sprayed at about 0.01 to 50 mL/hour.

In an exemplary embodiment, one electrospraying needle is used to spray the catalyst-containing material onto the nanofibers on the substrate. However, in some embodiments, it may be desirable to use multiple electrospray needles.

The substrate onto which the catalyst-containing droplets are electrosprayed and polymer-containing fine streams are electrospun is conductive such that, when grounded, there is an electromagnetic field formed between the substrate and electrospinning needle/electrospray needle. The substrate can be made from any suitable conductive material. In preferred embodiments, the substrate is made of a metal, such as, for example, aluminum (Al).

Figure 6:
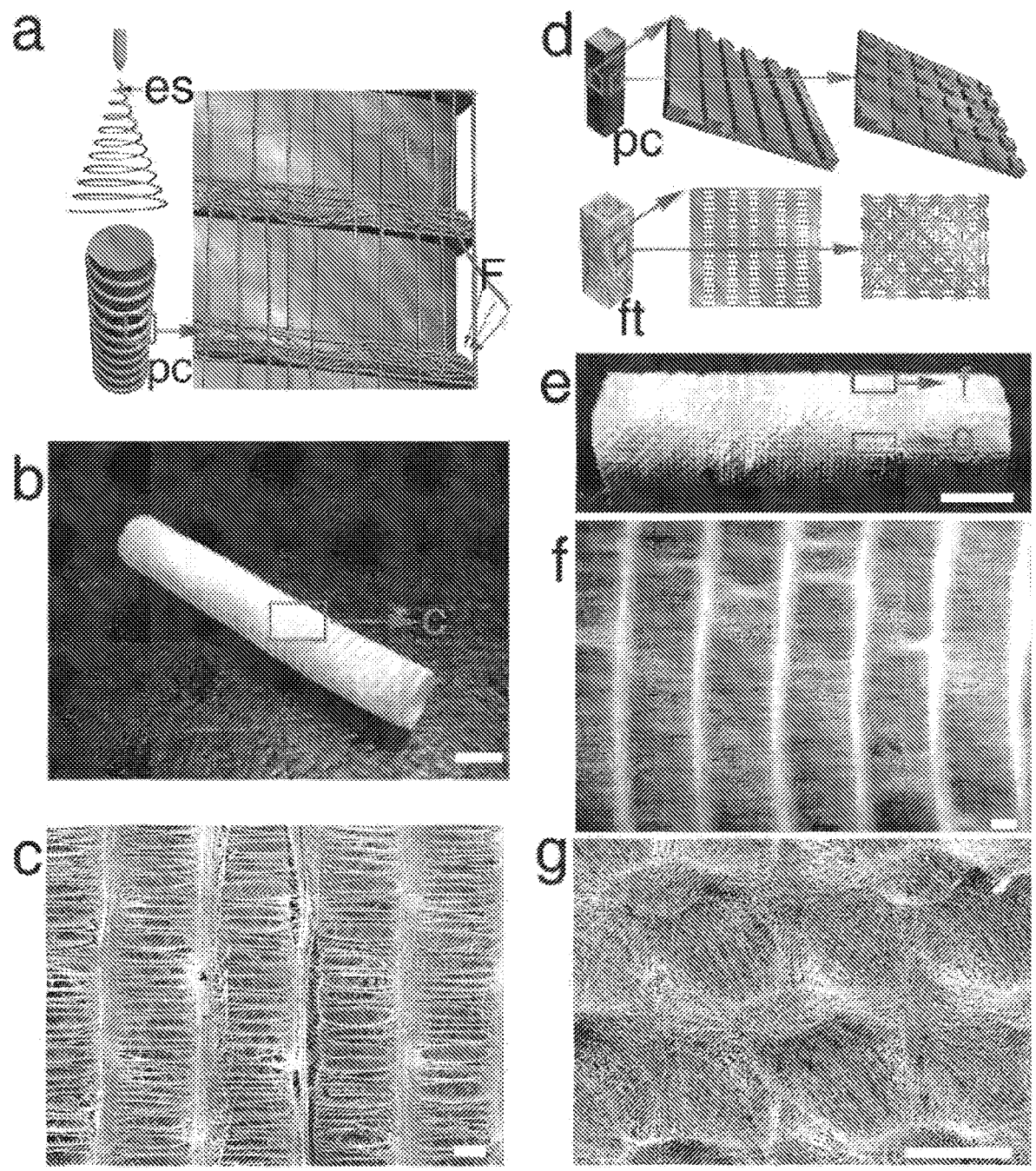
FIG. 6 shows micro-patterned substrates that may be used in the present invention.

In some exemplary embodiments, the substrate may be patterned or micro-patterned as shown in FIG. 6 to provide control over the nanofiber morphology and provide an improved fuel cell performance even at low catalyst loadings. Micro-patterned substrates are disclosed in Zhang and Chang, "Electrospinning of three-dimensional nanofibrous tubes with controllable architectures," Nano Letters, vol. 8, no. 10, pages 3283-3287, 2008), which is incorporated herein in its entirety by reference. The use of a patterned substrate allows at least some or all of the nanofibers in the nanofiber/nanoparticle network to be aligned in a substantially parallel relationship relative to one another.

In step 7 of FIG. 1, the nanofiber-nanoparticle network is formed. If the polymer-containing material is a solution, the solvent evaporates to solidify the polymer and form nanofibers on the substrate. If molten polymer is employed, loss of heat from the polymer-containing material will form nanofibers on the substrate.

But the nanofibers generally have circular-shaped cross-sections, though other cross-sections may also be suitable. In some embodiments, the nanofibers are preferably solid (i.e., not hollow). However, it should be understood that in other embodiments, the fibers may be hollow at least at some sections of the nanofibers (e.g., nanotubes).

The nanofibers can have any suitable dimension. In some embodiments, the average nanofiber diameter is greater than about 10 nm; in some embodiments, greater than about 50 nm; and, in some embodiments, greater than about 100 nm. Nanofiber diameters less than these ranges may cause the structure to have insufficient mechanical integrity for some polymers used. The nanofiber diameters may be less than about 1 micron, more preferably less than about 500 nm. In some embodiments, the nanofiber diameters may be less than about 300 nm.

The length of the nanofibers may vary. In some embodiments, one or more nanofibers may have a length of at least about 500 microns; and, in some embodiments, at least one nanofiber has a length greater than about 1 mm. In some embodiments, it may be possible to achieve nanofiber lengths of greater than about 1 cm, or even significantly greater.

Forming of the nanofiber-nanoparticle network of step 7 also includes forming or depositing of catalyst nanoparticles on the nanofibers. The fine droplets containing catalyst material will dry by loss of solvent. The loss of solvent results in the formation of catalyst nanoparticles on the nanofibers. In some embodiments heat treatment may be needed to facilitate or accelerate the formation of nanoparticles.

The catalyst-containing nanoparticles are preferably substantially evenly distributed on the surface of nanofibers, though some aggregation of nanoparticles to aggregates of up to about 0.5 microns is generally acceptable. The nanoparticle size is generally in the nanometer range. For example, the nanoparticles may have an average particle size of less than about 50 nm; and, in some cases, less than about 20 nm. Small nanoparticle sizes may advantageously lead to the relatively uniform distribution of catalytic material throughout the nanofibers, as well as larger surface areas for oxidation, amongst other positive effects. However, the nanoparticles typically (though not always) have an average particle size of greater than 20 nm. It should be understood that nanoparticle sizes outside the above ranges may be used in certain embodiments of the present invention.

Average nanoparticle sizes may be determined by averaging the nanoparticle sizes of a representative number of nanoparticles using, for example, scanning electron microscope (SEM) techniques. As used herein, the average nanoparticle size includes sizes of primary nanoparticles and sizes of nanoparticle agglomerates. It may be preferred for the nanoparticle size distribution to be relatively narrow, and/or relatively homogenously distributed. Narrow nanoparticle size distributions promote the uniform distribution of catalytic material throughout the nanofiber-nanoparticle network.

During step 7 of FIG. 1, for the purpose of forming the nanofiber-nanoparticle network, heat may be applied to the materials deposited on the surface of the substrate. Heat may be introduced to the deposited nanofiber material and nanoparticle material by heating the substrate itself, or by some other suitable means such as heated air or infra-red radiation. The heat may accelerate the evaporation of solvent. Some further desirable transformations and/or reactions may also be initiated or accelerated by heating.

In a preferred embodiment of the present invention, the speed of electrospinning of nanofiber material and the speed of electrospraying of the nanoparticle material are controlled relative to one another. The optimal speed of electrospinning and optimal speed of electrospraying may be determined by a skilled person.

The movement of the electrospinning needle and/or the movement of the substrate are also preferably controlled to ensure that the nanofibers are substantially evenly distributed over at least portion of the surface of the substrate. In addition, the motion of the electrospinning needle and the electrospray needle are also preferably controlled to ensure that catalyst nanoparticles are evenly deposited on substantially all of the nanofibers.

In some exemplary embodiments, the substrate may be kept stationary, while both the electrospinning needle and electrospray needle move in the space over the substrate to spread the nanofibers and nanoparticles on the surface of the substrate. In one embodiment, the stationary substrate may be cylindrical. The electrospinning needle and electrospray needle may both rotate around the cylindrical substrate. In yet another embodiment, the stationary substrate may be flat. The electrospinning needle and electrospraying needle may both travel from one end of the flat substrate to the other end.

Figure 2:
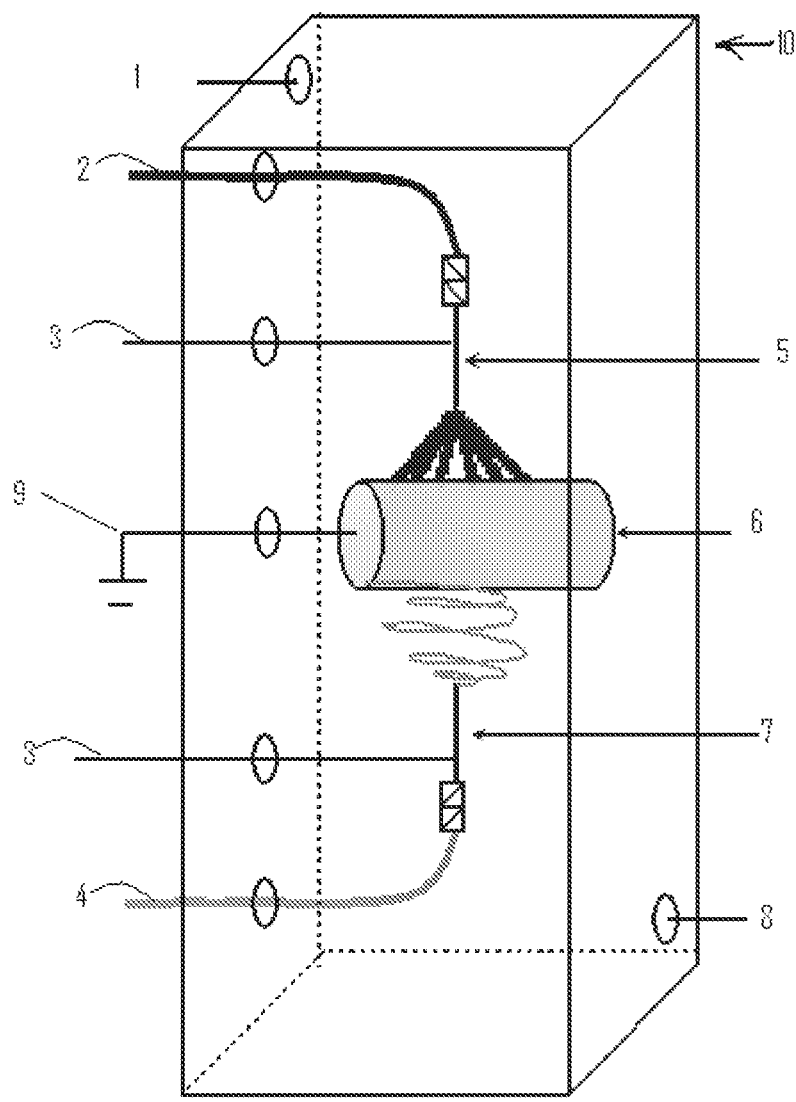
FIG. 2 shows another embodiment of a process for manufacturing a nanofiber-nanoparticle network according to the present invention.

Referring to FIG. 2, in an exemplary embodiment, the process of the present invention is carried out in a closed chamber 10. The chamber 10 has an air inlet 1 and an air outlet 8. A tube 2 supplies a catalyst-containing material to an electrospraying needle 5, which is connected to a high voltage power supply by a wire 3. The substrate, a rotating collector 6 is grounded through a wire 9. A tube 4 supplies the polymer-containing material to electrospinning needle 7, which is connected to a high voltage power supply through a wire 3.

In this embodiment, electrospinning and electrospraying are carried out in any suitable manner. Because the collector 6 rotates, the nanofibers are substantially evenly distributed on the surface of the collector 6, and the nanoparticles are substantially evenly distributed on the nanofibers.

In certain embodiments, the process of the present invention may further comprise a treatment step. The treatment may be initiated either during or after the formation step 7 in FIG. 1. One such treatment step is the fusion of at least portion of the nanofibers at points where the nanofibers intersect. The nanofibers may be fused together during the beginning stage of heat treatment. This fusion may lead to increased mechanical integrity and/or increased conductivity. Some of the nanofibers may be merely in physical contact with one another at intersection points without being fused together.

Figure 7:
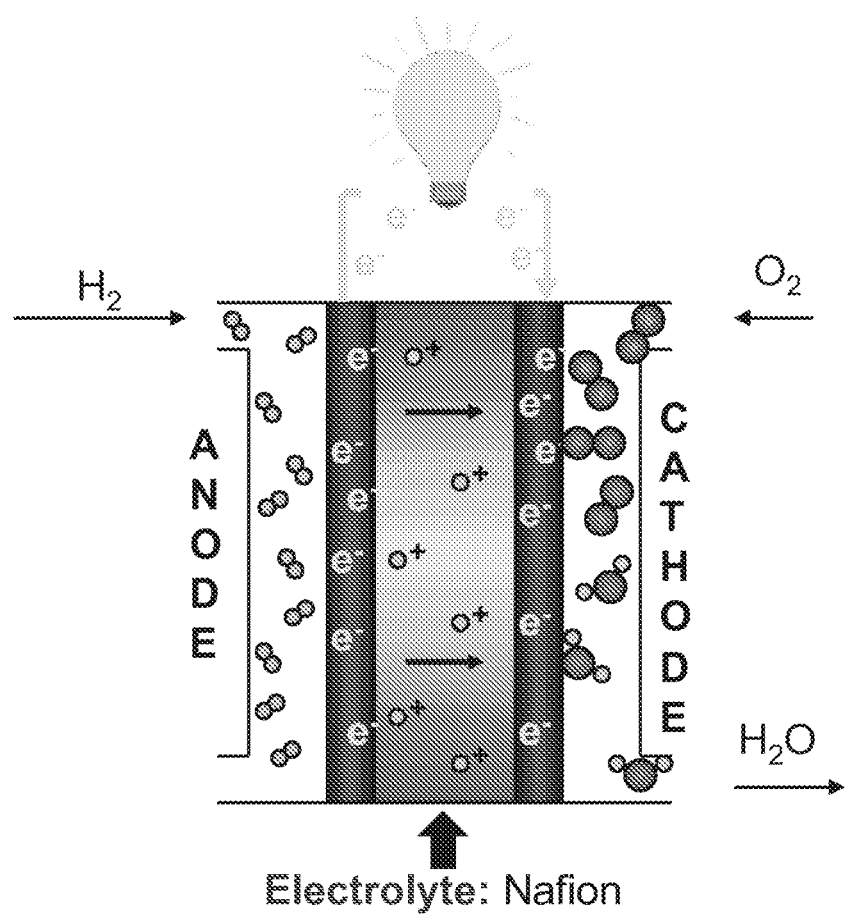
FIG. 7 shows a fuel cell including an electrode made by the process of the present invention.

The nanofiber-nanoparticle network made by the method depicted in FIG. 1 is suitable for use as an electrode in fuel cells. The conductive substrate used for electrospinning/electrospraying may be removed from the nanofiber-nanoparticle network before the nanofiber-nanoparticle network is used as an electrode. FIG. 7 shows an exemplary embodiment of a hydrogen fuel cell using electrodes with a nanofiber-nanoparticle network made by the process described in the present invention. In this exemplary fuel cell, the electrolyte is made from Nafion™.

Figure 8:
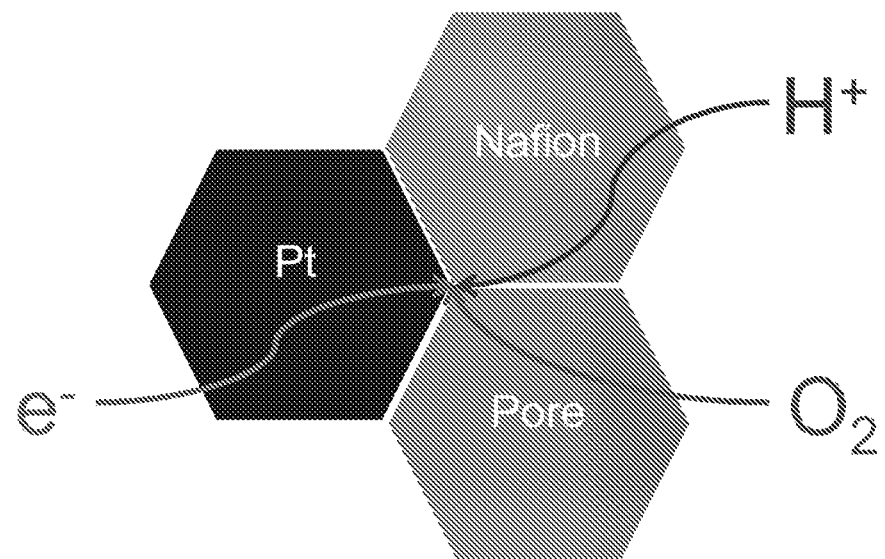
FIG. 8 shows a diagram of the interface of three phases: catalyst, polyelectrolyte, and pores.

One advantage of the nanofiber-nanoparticle network made by the method depicted in FIG. 1 is the availability of a larger surface area per unit of catalyst, where the reaction of the fuel cells us carried out, as shown in FIG. 8. For example, the electrodes embodying the nanofiber-nanoparticle network may be porous electrodes consisting of, for example, platinum (Pt) as catalyst in the form of nanoparticles, Nafion™ polymer, and pores. Hydrogen and oxygen react on the Pt surface and protons are transported through the Nafion™ polymer connected the network. Nafion™ acts as both a binder and a proton transporter and the pores serve as channels for gas diffusion to the catalyst surface.

The electrodes of the present invention may have catalyst loading of, for example, less than 0.1 mgPt/cm$^2$, more preferably, less than 0.05 mgPt/cm$^2$, and most preferably, less than 0.01 mgPt/cm$^2$. It has been found that these relatively low catalyst loadings for electrodes of present invention provided power densities comparable to electrodes having a standard loading of 0.4 mgPt/cm$^2$, (0.77 gPt/kW, 0.522 W/cm$^2$), which electrodes were made by a standard electrode fabrication technique. Electrodes made by the present invention may have a Pt loading/power of at least 0.1 gPt/kW, more preferably, at least 0.06 gPt/kW. This is much lower than the 2015 Department of Energy target of 0.15 gPt/kW.

The invention will now be illustrated by the following examples which are not to be construed as limiting of the invention.

EXAMPLES

Example 1

A nanofiber-nanoparticle network made by the process according to the present invention was used in electrodes for a fuel cell. These electrodes used platinum as the catalyst. It was observed that these electrodes had a high fuel cell power density at Pt loadings that are 40 times lower than typical Pt loadings used in state-of-the-art fuel cells.

More specifically, a 0.01 mgPt/cm$^2$ (0.158 W/cm$^2$, 0.06 gPt/kW) loading for electrodes of present invention provided power densities comparable to the standard catalyst loading of 0.4 mgPt/cm$^2$, (0.77 gPt/kW, 0.522 W/cm$^2$) of electrodes made by a standard electrode fabrication technique. It was also observed that the Pt loading/power was 0.06 gPt/kW for the electrode of the present invention, which was much lower than the 2015 Department of Energy target of 0.15 gPt/kW.

Example 2

Nanofibers made from Nafion™ were found to have extremely high proton conductivity. FIG. 3A, is an SEM image of a single Nafion™ nanofiber bridging the gap between two metal electrodes. FIG. 3B is an enlarged image of FIG. 3A. The Nafion™ nanofiber's proton conductivities at 30° C. and 90% relative humidity as a function of nanofiber diameter are shown in FIG. 3C. The proton conductivities of nanofibers with diameters>2 μm was similar to that of bulk Nafion™ film (~0.1 S/cm). However, when the nanofiber diameter was <1 μm, proton conductivity increased sharply with decreasing nanofiber diameter and reached a value as high as 1.5 S/cm for the 400 nm nanofiber, which was an order of magnitude higher than the bulk Nafion™ film. The relative humidity also affected the proton conductivity of the Nafion™ nanofiber, as shown in FIG. 3D. See also Dong, B.; Gwee, L.; Salas-de la Cruz, D.; Winey, K. I. Elabd, Y. A. Super Proton Conductive High Purity Nafion™ Nanofibers. Nano Letters 2010, 10, 3785-3790.

Example 3

Figure 4A:
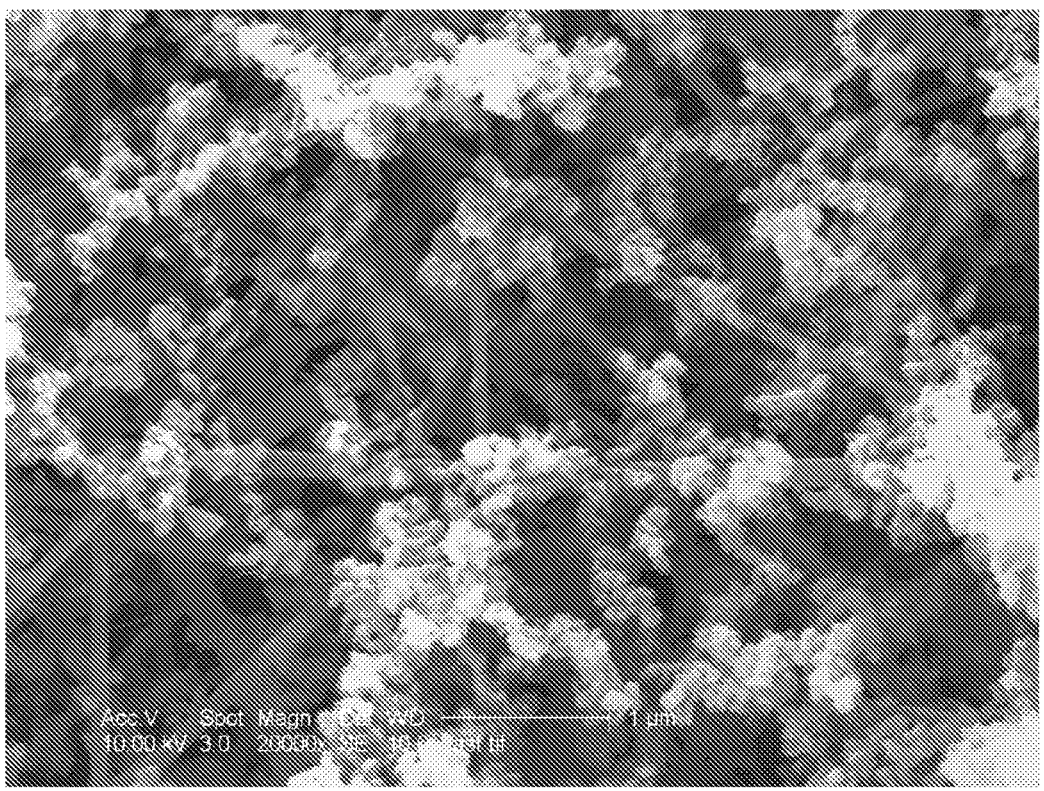
FIG. 4A is a scanning electron microscope (SEM) image of ante mortem nanofiber-nanoparticle network manufactured according to the present invention.
Figure 4B:
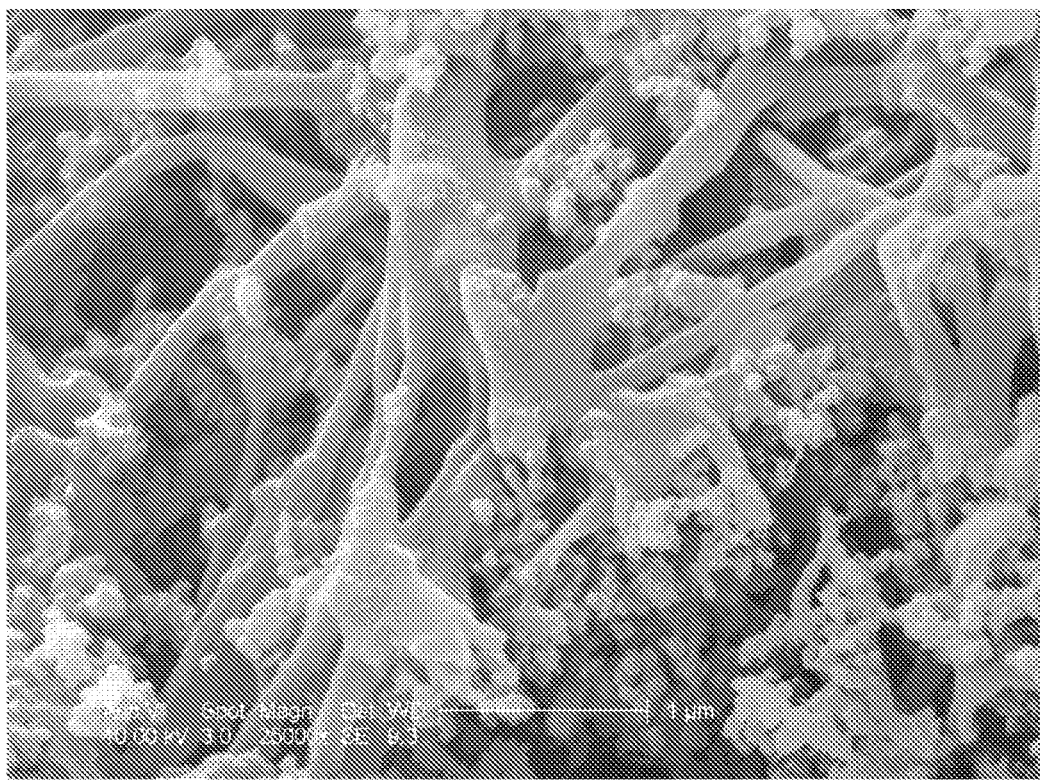
FIG. 4B is an SEM image of post mortem nanofiber-nanoparticle network manufactured according to the present invention.

The ion-conducting nanofiber-nanoparticle network manufactured according to one embodiment of the present invention is shown in FIGS. 4A and 4B. This network is ideal for use as a fuel cell electrode. SEM images of the electrode ante mortem (FIG. 4A) and post mortem (FIG. 4B) demonstrate the nanofiber morphology, where catalyst nanoparticles are substantially evenly distributed on the surface of the nanofibers create an electrode with high surface area. Such electrodes have a low catalyst loading and a high power density.

Example 4

A custom-designed apparatus for producing electrodes according to the electrospinning/electrospraying (E/E) process of the present invention was used to fabricate electrodes in this example. The apparatus consisted of two high-voltage power supplies (Model PS/EL50R00.8 of Glassman High Voltage, Inc. and Model ES40P-10W/DAM of Gama High Voltage Research), two syringe pumps (Model NE-1000, New Era Pump Systems), two syringe needles (i.d.=0.024 in.) (Hamilton), tubing (Pt No. 30600-65, Cole-Parmer), and a grounded collector (aluminum foil coated drum, o.d.=4.85 cm). The collector drum was connected to a motor (Model 4IK25GN-SW2, Oriental Motor) to allow for rotation during the E/E process. A gas diffusion layer was adhered to the collector drum, where nanofibers/nanoparticles were directly collected via the E/E process. The needle tip to collector distances, applied voltages, and solution flow rates were 15 cm and 9 cm, 10.5 kV and 12.5 kV, and 0.3 ml/h and 3 ml/h for the E/E process, respectively. As a comparison, a hand-painting process was used to make hand-painted electrodes as a control.

The materials used to fabricate the electrodes included de-ionized (DI) water, isopropanol (IPA, Sigma-Aldrich, 99.5%), ethanol (Decon Labs, Inc., 99.5%), and 5 wt % Nafion™ in a water/isopropanol solution (1000 EW, Ion Power), poly(acrylic acid) (PAA) (Mv=450,000 g/mol, Aldrich), 20 wt % Pt on carbon catalyst (Vulcan XC-72, Premetek Co.), and a SGL-25BC gas diffusion layer (Fuel Cells Etc.). These materials were used to fabricate the electrodes in both the hand-painting process (to fabricate hand-painted electrodes) and the E/E process of the present invention (to fabricate E/E electrodes).

Catalyst ink used in the electrospraying portion of the E/E process according to the present invention consisted of 20 mg platinum (Pt) catalyst, 0.248 ml DI water, 0.043 ml 5 wt % Nafion™ solution, 0.171 ml IPA/H$_2$O (3/1 v/v), and 1.970 ml ethanol. This mixture was sonicated for 3 min (Model CL-18, Qsonica Sonicator) prior to electrospraying. This mixture corresponds to 10/1 wt/wt (Pt/C)/Nafion™, which was five times greater than the same ratio in the catalyst ink prepared for the hand-painted electrodes. Significantly less Nafion™ was required for electrospraying, because Nafion™ was also supplied from the electrospinning to produce the E/E electrode. The final (Pt/C)/Nafion™ ratio in the E/E electrode was similar to that of the hand-painted electrode, since Nafion™ was supply to electrodes from both electrospraying and electrospinning The polymer solution used in the electrospinning portion of the E/E process consisted of a mixture of 4/1 wt/wt Nafion™/PAA. A solution of 5 wt % PAA and Nafion™ was prepared by combining 131.1 mg PAA, 10494 mg of 5 wt % Nafion™ solution, and 2491.7 mg IPA/water (3/1 v/v). This solution was stirred at 70-80° C. for ~12 h to ensure complete dissolution. The solution was cooled down to ambient temperature before electrospinning The electrodes were annealed at 135° C. for 5 min to stabilize the nanoparticles and nanofibers right after the E/E process. For the E/E electrodes, the Pt loading was varied by changing the E/E process time for making a particular electrode.

The catalyst ink used to make hand-painted electrodes was prepared by combining 100 mg solid Pt catalyst, 550 mg DI water, 1000 mg 5 wt % Nafion™ solution, and 1350 mg IPA and mixing via sonication for 3 min. This mixture corresponds to 2/1 wt/wt (Pt/C)/Nafion™ and 3/1 v/v IPA/water.

Membrane electrode assemblies (MEA's) were made by sandwiching together the hand-painted electrodes or E/E electrodes and NR-212 Nafion™ membrane. The anode catalyst layers of all of the membrane electrode assemblies were hand-painted with a Pt loading of 0.15 mg/cm². All of the membrane electrode assemblies were hot-pressed at 135° C., 33 psi for 5 minutes.

Example 5

The catalyst loading of the electrodes fabricated in Example 4 was determined by thermogravimeteric analysis (hereinafter "TGA") (TGA 7, Perkin Elmer). A small portion of the E/E electrode (~5-7 mg) was heated during the TGA from ambient temperature to 900° C. at 5° C./min in air flowing at 20 ml/min. Since all components in the E/E electrode volatilize above 900° C., with the exception of Pt, the Pt loading was determined by comparing the weight of the E/E electrode before and after exposure to a temperature of 900° C. in the TGA.

Morphological characterization of the E/E electrodes fabricated in Example 4 was carried out with scanning electron microscopy (SEM, Model FEI/Philips XL-30, 10 kV). SEM images of the E/E electrode were obtained after the E/E process (on a gas diffusion layer) and before MEA fabrication. All samples were sputter-coated (Denton Desk II Sputtering System) with platinum at 40 mA for 30 seconds before the SEM images were taken.

Figure 9A:
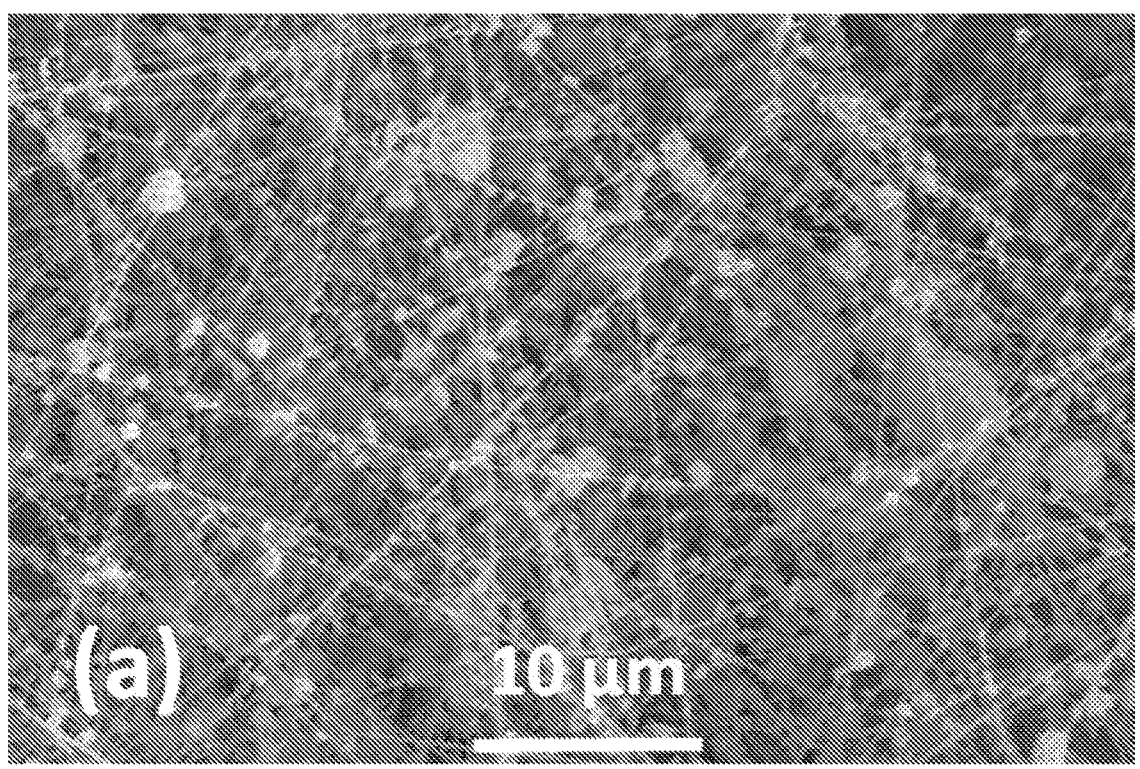
FIG. 9A is an SEM image of an electrode with 0.022 mg/cm$^2$ platinum (Pt) loading, fabricated according to the method of Example 4 according to one embodiment of the present invention.
Figure 9B:
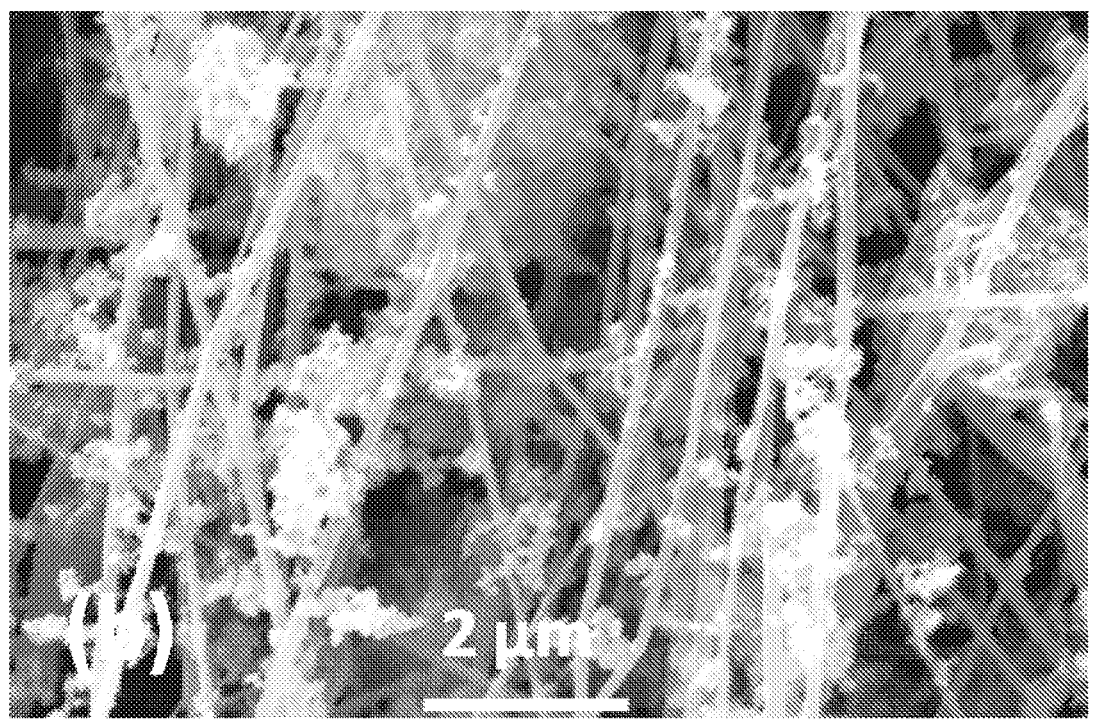
FIG. 9B is an enlarged SEM image of the same electrode shown in FIG. 9A.

SEM images of the E/E electrode with 0.022 mg/cm² Pt loading are shown in FIGS. 9A and 9B. FIG. 9A shows that the E/E electrode was porous and uniform over large length scales (~10 μm). The porous structure allows gas transport from the gas flow channel to the catalyst layer. The Nafion™/PAA nanofibers serve as pathways for proton transport, while the platinum/carbon (Pt/C) nanoparticles are the active sites for electrochemical reactions. FIG. 9B shows a magnified view of the E/E electrode of FIG. 9A, where several large agglomerates (~1-2 μm) were observed, while the majority of catalyst particles ranged in size from ~50-300 nm. The larger agglomerates were rough and porous, which still allow for gas/fuel to penetrate and diffusion for electrochemical reaction. When the E/E electrode was compressed, the nanoparticles and nanofibers formed a tightly packed network for both electron and proton transport.

Figure 9C:
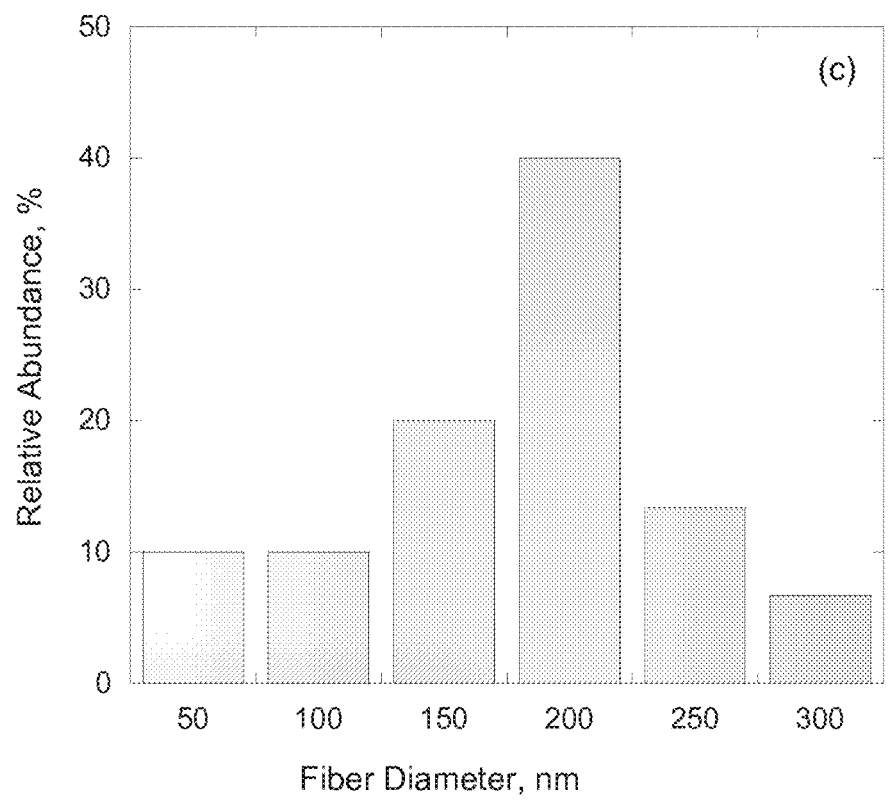
FIG. 9C is plot of the distribution of the diameters of nanofibers in the same electrode shown in FIGS. 9A-9B.

Using SEM, the size distributions of the nanoparticles and nanofibers in the E/E electrodes were also studied. Thirty of the nanofibers shown in FIG. 9B were randomly selected using ImageJ software for determination of nanofiber diameter by SEM. FIG. 9C presents the distribution of the diameters of the thirty randomly selected nanofibers. It was observed that the majority of the nanofibers had diameters of ~200 nm.

Figure 9D:
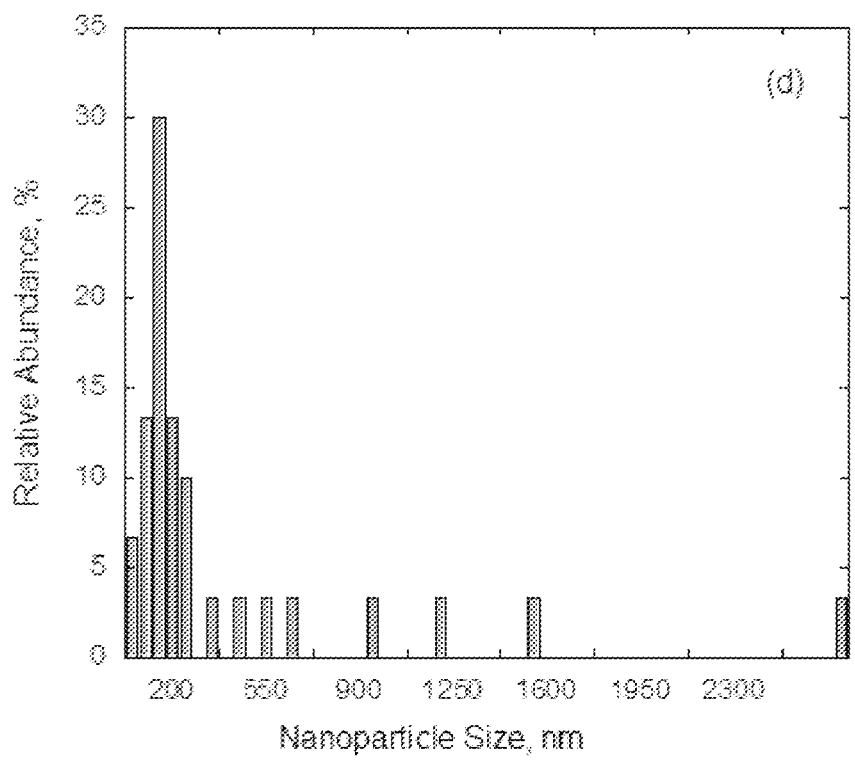
FIG. 9D is a plot of the distribution of the sizes of the nanoparticles in the same electrode shown in FIGS. 9A-9B.
Figure 9E:
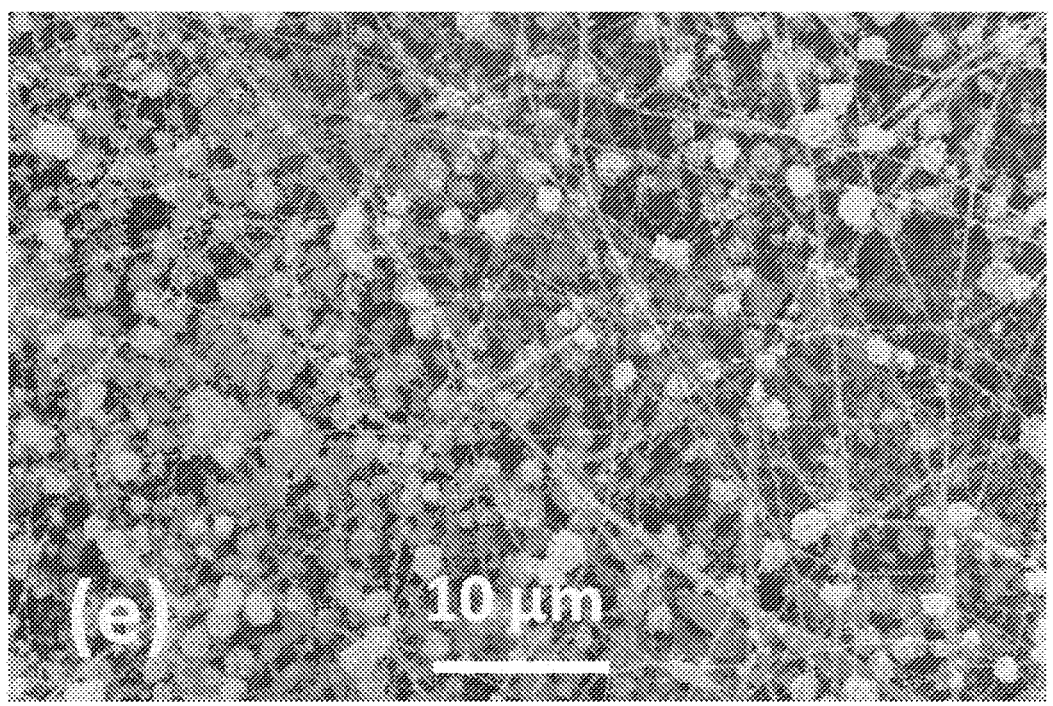
FIG. 9E is an SEM image of an electrode with 0.052 mg/cm$^2$ Pt loading, fabricated by the method of Example 4 according to one embodiment of the present invention.
Figure 9F:
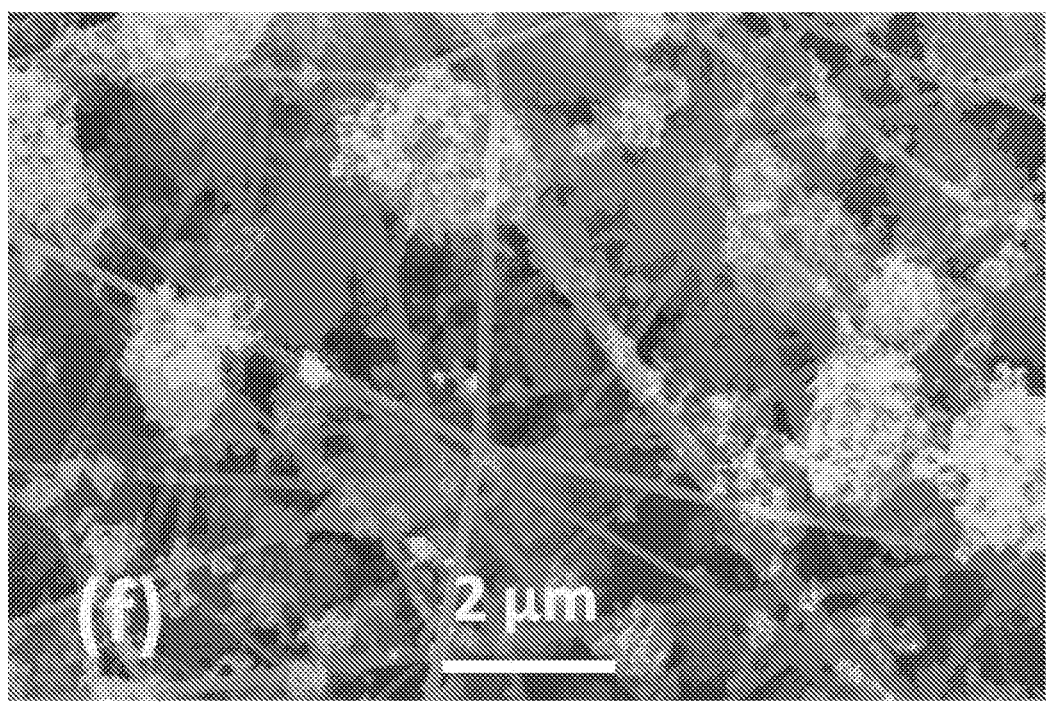
FIG. 9F is an enlarged SEM image of the electrode shown in FIG. 9E.

The sizes of the same nanoparticles randomly selected from FIG. 9B was also determined by SEM. FIG. 9D shows the distribution of nanoparticle size (diameter) in the E/E electrode. The size distribution of the nanoparticles was broader than that of the nanofibers, with ~80% of the nanoparticles being less than 450 nm in diameter.

Figure 9G:
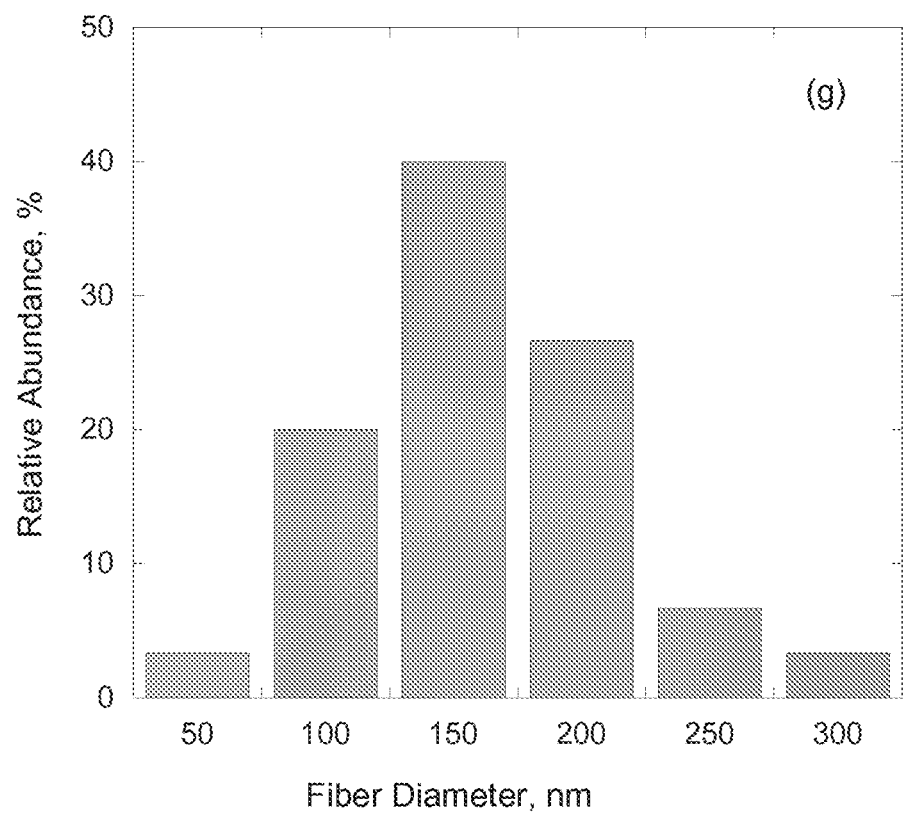
FIG. 9G is plot showing the distribution of the diameters of nanofibers in the electrode shown in FIG. 9E.
Figure 9H:
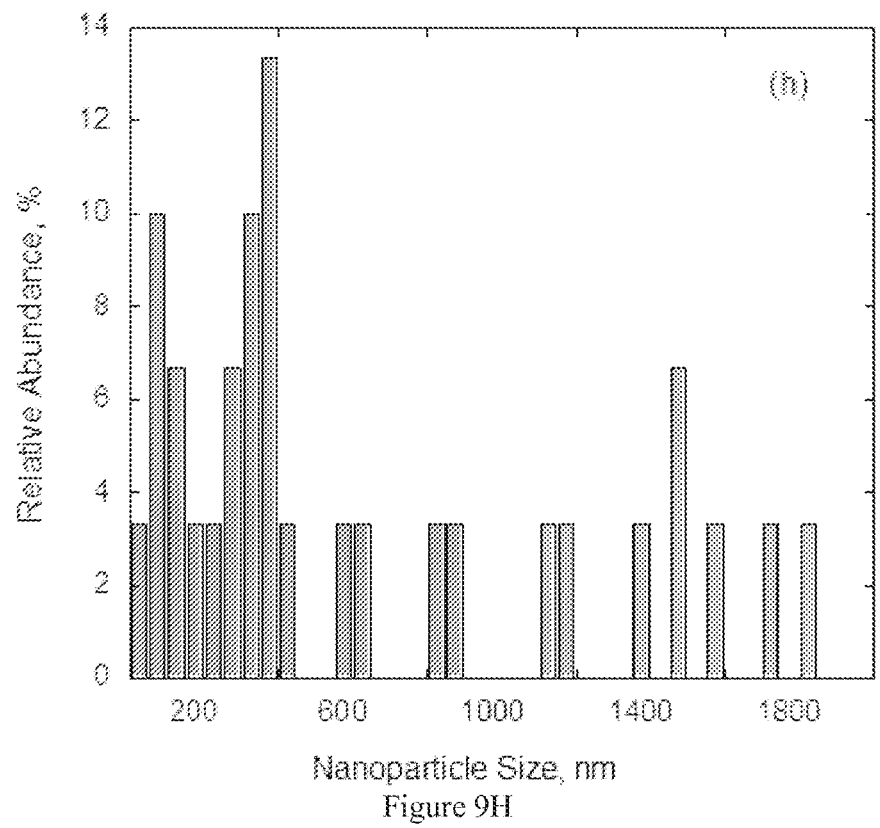
FIG. 9H is a plot showing the distribution of the sizes of nanoparticles in the electrode shown in FIG. 9E.

A similar morphological study was also conducted on an E/E electrode with a higher Pt loading (0.052 mg/cm²), which was also fabricated in Example 4 (see FIGS. 9E-9H). Surprisingly, more catalyst agglomerates were seen in FIG. 9E than for the E/E electrode with the lower Pt loading shown in FIG. 9A. This may be due to a slight change in the ambient temperature and relative humidity that may have affected the viscosity and evaporation rate of the solvent in the catalyst ink. The distributions of nanofiber diameters and nanoparticle sizes in FIGS. 9G and 9H show that that the nanofiber sizes were similar to those shown in FIG. 9C, but that the nanoparticle sizes were on average larger than those in FIG. 9D. This suggests that, though a change in ambient conditions may affect nanoparticle size, it may not have a significant effect on nanofiber diameters.

Additionally, it was observed that the electrosprayed nanoparticles were more sensitive to slight changes in operating conditions. The flow rate of the electrospraying process (3 ml/h) was higher than the flow rate of the electrospinning process (0.3 ml/h). The higher flow rate of the electrospraying relative to the electrospinning was selected to achieve a desired ratio of Pt/C to Nafion™ (2:1) in the catalyst layer. The higher flow rate of the electrospraying solution required a longer time to fully evaporate the solvent inside the nanoparticles. As a result, a slight change in operating conditions such as relative humidity and temperature could significantly affect the morphology and size of the nanoparticles in the E/E electrodes, but appears to have a lesser effect on the diameter of the nanofibers.

Example 6

The membrane electrode assembly (1.21 cm², made in Example 4) was put into fuel cells (as cathode) with 100 lb force torque. The membrane electrode assembly was placed between two serpentine flow field graphite plates separated by two 0.160 mm thick Teflon® coated gaskets (Pt No. 381-6, Saint Gobian). A hand-painted cathode with a 0.42 mg/cm² Pt loading was used as a control. For the E/E cathode electrodes, the Pt loading had two levels: 0.052 and 0.022 mg/cm². Hand-painted electrodes with 0.15 mg/cm² Pt loading were used as the anode in all fuel cells in this Example.

The fuel cell performances were evaluated with a Compact Fuel Cell Test System (850C, Scribner Associates, Inc.). Fuel cell tests were conducted at ambient temperature and 25 psi back pressure with anode and cathode flow rates of 0.42 L/min hydrogen and 1.0 L/min air, respectively. The cathode, anode, and fuel cells were kept at 80° C. When $H_2$ and $O_2$ were supplied to the anode and cathode, the flow rates were 0.42 L/min and 0.50 L/min, respectively. Polarization curves were collected from open circuit to 0.2 V at increments of 0.05 V/min.

The fuel cell performance was recorded after a new membrane electrode assembly was fully activated. The activation process for the fuel cells included operating a membrane electrode assembly at 0.7 V for 1-2 hours followed by scanning the voltage from open circuit potential to 0.2 V several times. This activation process lasted ~4-6 h and may be repeated until the membrane electrode assembly reached steady state. A steady state was reached when no further increase in the current was observed and the fuel cell was held at constant voltage. All fuel cell performances were measured using fully saturated anode and cathode feeding gases (Relative Humidity=100% for anode and cathode).

Figure 10A:
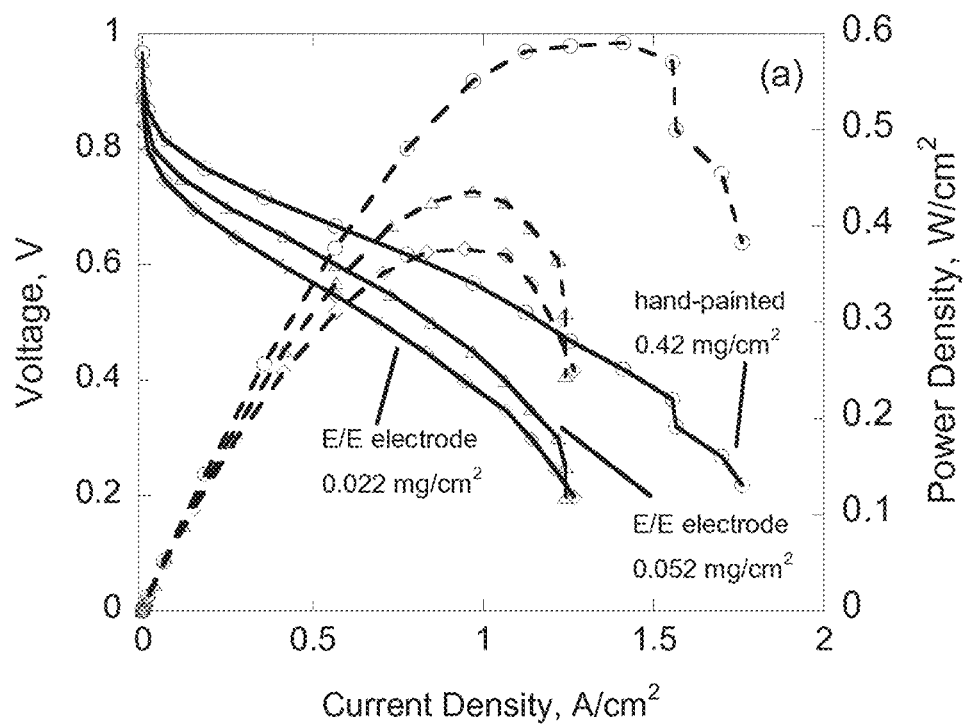
FIG. 10A shows performance of fuel cells with the electrodes fabricated in Example 4 and comparative hand-painted control electrodes with operating conditions of H$_2$/air at ambient pressure.
Figure 10B:
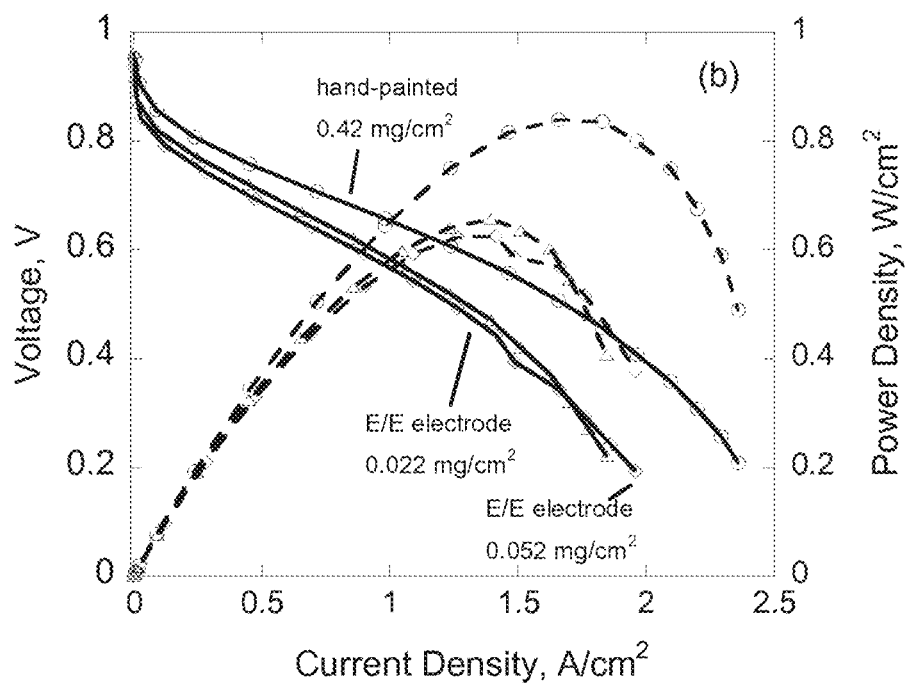
FIG. 10B shows performance of the same fuel cells used in FIG. 10A, at operating conditions using H$_2$/air with 25 psi back pressure.

FIGS. 10A-10D show the performance of fuel cells with the E/E cathodes at both Pt loading levels, as well as fuel cells with the hand-painted cathodes as control. FIG. 10A shows that the fuel cell performance increased with the Pt loading. The maximum power density of the control experiment (hand-painted cathode with 0.42 mg/cm$^2$ Pt loading) was 0.59 W/cm$^2$, while the E/E cathodes with 0.052 and 0.022 mg/cm$^2$ Pt loadings resulted in maximum power densities of 0.436 W/cm$^2$ and 0.376 W/cm$^2$, respectively. When the Pt loading of the E/E electrode (0.052 mg/cm$^2$ Pt loading) was 8-fold lower than the hand-painted electrode (0.42 mg/cm$^2$ Pt loading), the output power was only reduced by 37%. The output power of the E/E electrode with 0.022 mg/cm$^2$ Pt loading was 20-fold lower than the output power hand-painted control electrode, but this only resulted in a 46% reduction in the maximum output.

The effect of the catalyst loading on the fuel cell performance when back pressure was applied to the fuel cells was also investigated. Under back pressure, the fuel cell performance was less affected by the catalyst loading on the electrode (FIG. 10B), probably because back pressure led to a higher concentration of the reactants at the catalyst surface. When 25 psi back pressure (39.7 psi absolute pressure) was applied to both the cathode and anode in the fuel cells, the maximum output power for the control experiment (0.42 mg/cm$^2$ Pt loading on the hand-painted cathode) was 0.839 W/cm$^2$. For the E/E cathodes with 0.022 mg/cm$^2$ and 0.052 mg/cm$^2$ Pt loading, the maximum output power was 0.625 W/cm$^2$ and 0.656 W/cm$^2$, respectively. This corresponded to a reduction of only 26% and 22% in the maximum output power for the E/E electrodes compared to the hand-painted control electrode. Thus, the fuel cells with E/E electrodes were capable of generating high power densities at ultra-low Pt loadings (significantly lower cost than control).

Figure 10C:
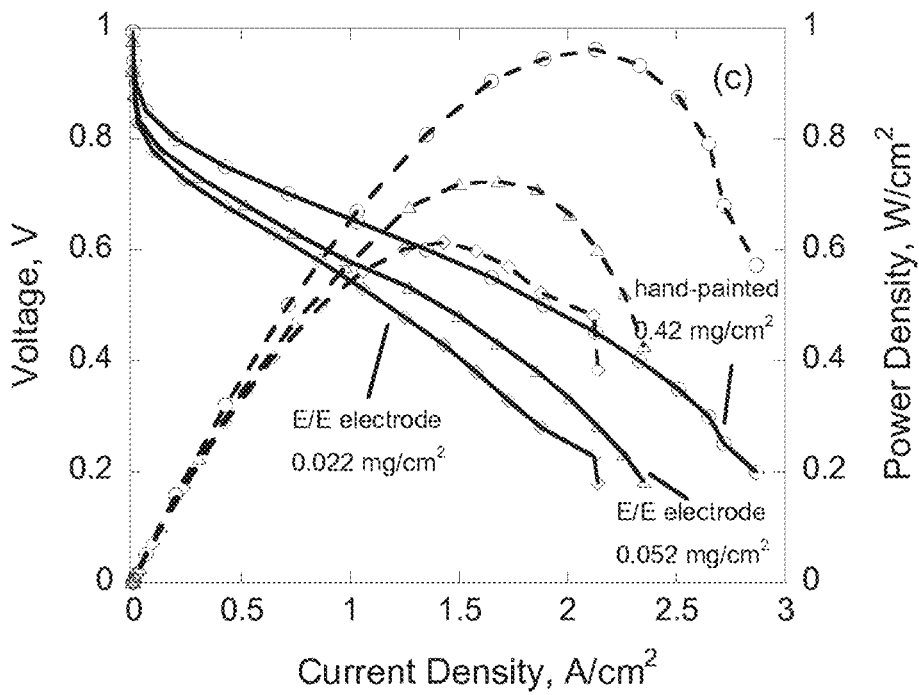
FIG. 10C shows performance of the same fuel cells used in FIG. 10A, at operating conditions using H$_2$/O$_2$ at ambient pressure.
Figure 10D:
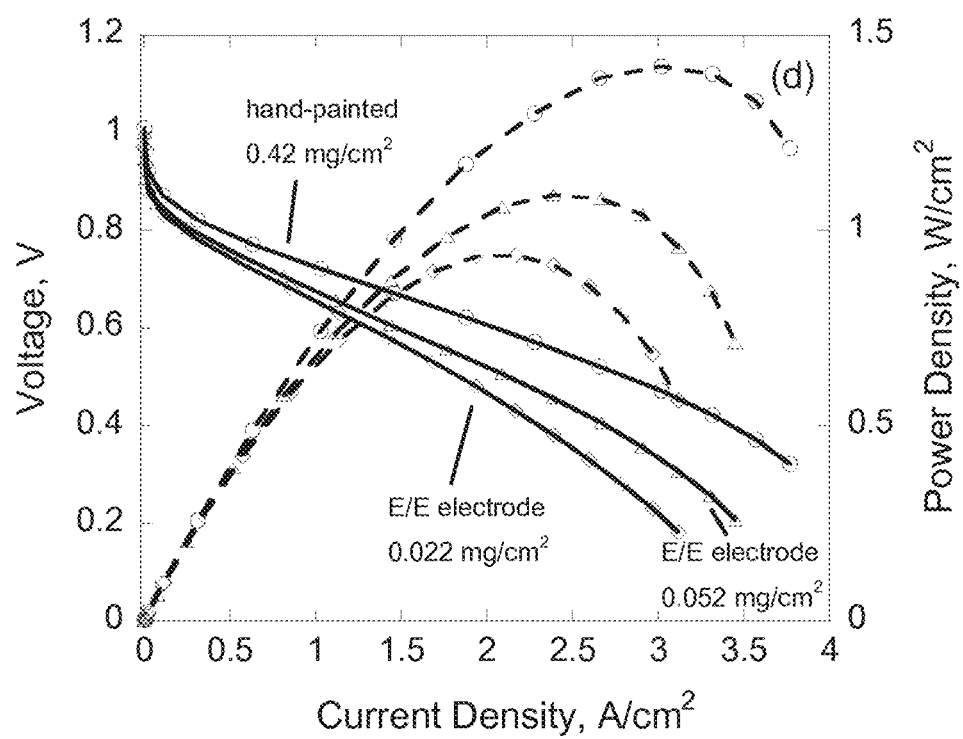
FIG. 10D shows performance of the same fuel cells used in FIG. 10A, at operating conditions using H$_2$/O$_2$ with 25 psi back pressure.

FIG. 10C shows fuel cell performance with oxygen ($O_2$), instead of air, as the cathode fuel. It was observed that the fuel cell performance in the high current region (mass transport-limiting region) improved significantly in comparison with when air was used as the cathode fuel. This might be due to the fact that pure oxygen drives a more efficient electrochemical reaction at the anode. An output power density of 0.962 W/cm$^2$ was achieved when pure oxygen was supplied to the hand-painted cathode in the control experiment. For the E/E cathodes with significantly lower Pt loadings than the control hand-painted cathode, the maximum power output was still high (0.724 W/cm$^2$ and 0.614 W/cm$^2$ for the 0.052 mg/cm$^2$ and 0.022 mg$^2$/cm Pt loadings, respectively). This corresponded to only a 25-36% lower maximum output power density compared to the control experiment with an 8-20-fold reduction in Pt loading. When 25 psi back pressure was applied to both the cathode and anode sides, a further improvement in fuel cell performance was observed (FIG. 10D), with back pressure reducing the difference in performance between the hand-painted cathode and E/E cathodes.

Example 7

Electrochemical properties of the electrodes fabricated in Example 4 were studied by cyclic voltammetry (CV), which was conducted on a two-electrode membrane electrode assembly (made in Example 4) with a potentiostat (Solartron SI 1287, Corrware Software) at 20 mV/s over a range of 0 to 1.2 V. The anode worked as both the counter and reference electrodes. The electrochemical surface area (ECSA) of the electrodes was determined from the hydrogen adsorption area from 0.1 to 0.4 V. The fuel cell anode and cathode were supplied with $H_2$ at 40 sccm (standard cubic centimeters per minute) and $N_2$ at 18 sccm, respectively. Temperatures of the cathode, anode and fuel cell were held at 30° C. The Pt catalyst was assumed to have an average site density of 210 μC/cm$^2$. Using the Pt loading and maximum power density ($H_2$/air at ambient pressure), the platinum utilization (g of Pt in cathode/kW of fuel cell max power) was calculated.

Several electrochemical properties of the electrodes are summarized in Table 1. The E/E electrodes had much higher ECSA than the hand-painted electrodes. The platinum utilization value for the E/E electrodes was lower than the target set by the U.S. Department of Energy (DOE 2012 target) indicating that these electrodes meet DOE specifications. The superior performance of fuel cells with E/E electrodes even with less Pt loading may be at least partially due to the reason that the E/E electrodes had ECSAs significantly higher than the hand-painted control electrode.

TABLE 1

Electrochemical properties of catalyst layers in electrodes

| Cathode | Loading, mg/cm$^2$ | ECSA, m$^2$/g | Pt utilization at maximum power, $g_{Pt}$/kW |
|---|---|---|---|
| Hand-painted | 0.42 | 53.2 | 0.71 |
| E/E | 0.022 | 121.3 | 0.059 |
| E/E | 0.052 | 101.7 | 0.121 |
| DOE 2017 target | — | — | 0.125 |

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

The invention claimed is:

1. A method of making a polymer fiber structure, the method comprising:
    applying a polymer to a substrate via an electrospinning needle to form a nanofiber material on the substrate; and
    applying a catalyst to the nanofiber material via a separate electrospraying needle to deposit the catalyst on the nanofiber material.

2. The method of claim 1, wherein the polymer comprises Nafion.

3. The method of claim 1, wherein the polymer is selected from the group consisting of Nafion, sulfonated poly(ether ether ketone), sulfonated polyer(styrene-b-ethylene-r-butadiene-b-styrene), sulfonated poly(styrene), sulfonated poly(arylene ether) copolymer, sulfonated poly(styrene-b-isobutylene-b-styrene).

4. The method of claim 1, wherein the polymer has a proton conductivity of between 0.001 mS/cm to 10 S/cm.

5. The method of claim 1, wherein, prior to the applying the polymer, the polymer is dissolved in a solvent to form a polymer solution.

6. The method of claim 5, wherein the polymer solution is selected from the group comprising N,N-dimethylformamide (DMF), ethanol, methanol, acetone, water, tetrahydrofuran (THF), and methylene chloride.

7. The method of claim 5, wherein the polymer solution has a polymer concentration of between 8% and 20% by weight of the polymer solution.

8. The method of claim 1, wherein, prior to the applying the polymer, the polymer is melted.

9. The method of claim 1, wherein the electrospinning needle is connected to a high voltage power supply and the substrate is grounded.

10. The method of claim 9, wherein a voltage applied to the electrospinning needle by the high voltage power supply is between 3 kV and 50 kV.

11. The method of claim 1, wherein a distance between a tip of the electrospinning needle and the substrate is between 1 cm and 50 cm.

12. The method of claim 1, wherein the electrospinning needle applies the polymer at a rate of between 0.1 to about 10 mL/hour.

13. The method of claim 1, wherein the polymer forms a continuous nanofiber on the substrate.

14. The method of claim 1, wherein the catalyst is in a solution that contains at least one catalyst that can function as an oxidation/reduction catalyst in a fuel cell.

15. The method of claim 1, wherein the catalyst is selected from the group consisting of palladium, platinum, gold, silver, nickel, rhodium, ruthenium, rhenium, osmium, iridium, iron, chromium, cobalt, copper, manganese, tungsten, niobium, titanium, tantalum, lead, indium, cadmium, tin, bismuth, and gallium.

16. The method of claim 1, wherein the electrospraying needle applies the catalyst at a rate of between 0.01 to 50 mL/hour.

17. The method of claim 1, wherein the substrate is conductive and forms an electromagnetic field between the substrate and electrospinning needle.

18. The method of claim 1, wherein the substrate comprises micro-patterns that control nanofiber morphology.

19. The method of claim 1, wherein the nanofiber material comprises nanofibers having an average diameter of greater than 10 nm.

20. The method of claim 1, further comprising forming an electrode from the nanofiber material.

\* \* \* \* \*